US012467609B2

(12) United States Patent
Li et al.

(10) Patent No.: US 12,467,609 B2
(45) Date of Patent: Nov. 11, 2025

(54) SPRING-ADJUSTABLE LED LIGHT FIXTURE AND IMPLEMENTATION METHOD THEREFOR

(71) Applicant: Hengdian Group Tospo Lighting Co., Ltd., Zhejiang (CN)

(72) Inventors: Tao Li, Jinhua (CN); Kaixuan Ge, Jinhua (CN); Jinli Shan, Jinhua (CN); Jinghang Zhou, Jinhua (CN); Miao Han, Jinhua (CN); Heng Li, Jinhua (CN); Yuan Jiang, Jinhua (CN)

(73) Assignee: Hengdian Group Tospo Lighting Co., Ltd., Jinhua (CN)

( * ) Notice: Subject to any disclaimer, the term of this patent is extended or adjusted under 35 U.S.C. 154(b) by 0 days.

(21) Appl. No.: 18/937,648

(22) Filed: Nov. 5, 2024

(65) Prior Publication Data

US 2025/0264213 A1 Aug. 21, 2025

(30) Foreign Application Priority Data

Feb. 21, 2024 (CN) ......................... 202410191277.0

(51) Int. Cl.

| | |
|---|---|
| ***F21V 21/04*** | (2006.01) |
| ***F21S 8/02*** | (2006.01) |
| *F21Y 115/10* | (2016.01) |

(52) U.S. Cl.

CPC ............ *F21V 21/047* (2013.01); *F21S 8/026* (2013.01); *F21Y 2115/10* (2016.08)

(58) Field of Classification Search

CPC ............................... F21V 21/047; F21S 8/026

See application file for complete search history.

(56) References Cited

U.S. PATENT DOCUMENTS

| | | | | |
|---|---|---|---|---|
| 9,010,956 | B1 * | 4/2015 | Davis | F21V 29/77 362/147 |
| 2017/0311399 | A1 * | 10/2017 | Shah | F21V 23/009 |
| 2019/0093864 | A1 * | 3/2019 | Huang | F21V 7/04 |
| 2019/0120448 | A1 * | 4/2019 | Li | F21V 21/04 |
| 2021/0102690 | A1 * | 4/2021 | Zeng | F21S 8/026 |
| 2023/0061006 | A1 * | 3/2023 | Fang | F21V 19/04 |
| 2024/0133539 | A1 * | 4/2024 | Lin | F21V 21/04 |
| 2025/0137623 | A1 * | 5/2025 | Li | F21V 17/002 |
| 2025/0137624 | A1 * | 5/2025 | Li | F21V 7/04 |

* cited by examiner

*Primary Examiner* — Christopher E Dunay

(57) ABSTRACT

Disclosed is a spring-adjustable LED light fixture, including a housing, where a light source plate is installed inside the housing; a reflection cup is provided below the light source plate; a diffusion plate is provided below the reflection cup; a face ring is connected below the circumference of the housing; two symmetrical spring installation bases are provided on the top surface of the housing; each of the spring installation bases includes a spring insert block; a limit wall is connected to a side of the spring insert block; a limiting member is further connected to the middle position of a side of the spring insert block; a spring body includes a V-shaped spring; an edgefold is connected to the middle position of the V-shaped spring and inserted into the spring installation base. Further disclosed is an implementation method for a spring-adjustable LED light fixture.

10 Claims, 8 Drawing Sheets

SPRING-ADJUSTABLE LED LIGHT FIXTURE AND IMPLEMENTATION METHOD THEREFOR

CROSS-REFERENCE TO RELATED APPLICATION

This Application claims priority to Chinese patent application No. 202410191277.0, filed Feb. 21, 2024, the entirety of which are herein incorporated by reference.

Technical Field

The present disclosure relates to the technical field of downlights, and in particular, to a spring-adjustable LED light fixture and an implementation method therefor.

Background

A downlight is a downward lighting fixture that is embedded into a ceiling. As for this hidden light fixture embedded into the ceiling, all light rays are projected down, i.e., direct light distribution. Different reflectors, lenses, blinds, and bulbs can be employed to achieve different light ray effects. The downlight occupies little space and can enhance the soft atmosphere of space. If it is desired to create a warm feeling, multiple downlights can be installed to reduce the oppressive feeling of space. Due to its characteristics of light gathering power, high light efficiency and low energy consumption, the downlight is popular in home lighting markets.

At present, springs of retrofitted downlights on the market are mostly fixed by a bracket, and when adjusted, metal tubes of different sizes need to be dismounted and adjusted to different positions, which is cumbersome in operation and low in efficiency. Moreover, the spring cannot be installed later, thereby increasing packaging dimensions and costs.

SUMMARY

An object of the present disclosure is to provide a spring-adjustable LED light fixture to solve the problems proposed in the background. The present disclosure provides a spring-adjustable LED light fixture, having the characteristic that the position of a spring is convenient to rapidly adjust.

Another object of the present disclosure is to provide an implementation method for a spring-adjustable LED light fixture.

In order to achieve the above objects, the present disclosure provides the following technical solution: a spring-adjustable LED light fixture, including a housing and spring bodies, where a light source plate is installed inside the housing; a reflection cup is provided below the light source plate; a diffusion plate is provided below the reflection cup; a face ring is connected below the circumference of the housing; two symmetrical spring installation bases are provided on the top surface of the housing; each of the spring installation bases includes a spring insert block; a limit wall is connected to a side of the spring insert block; a limiting member is further connected to the middle position of a side of the spring insert block; the spring body includes a V-shaped spring; an edgefold is connected to the middle position of the V-shaped spring and inserted into the spring installation base.

In order to insert the edgefold and limit the edgefold in an upward direction, further, the spring insert block is provided with a slot.

In order to facilitate the insertion of the edgefold, the spring bodies can be assembled with the housing when the light fixture is installed, thereby reducing packaging dimensions and costs. Further, a side, facing a direction of insertion of the edgefold, of the limiting member is provided with an inclined surface, and the other side, back to the direction of insertion of the edgefold, of the limiting member is a vertical surface.

In order to achieve an assembled connection between the diffusion plate and the housing, further, the inner wall of the housing is provided with a annular groove, and the diffusion plate is embedded into the annular groove.

In order to achieve an assembled connection between the face ring and the housing, further, a conical wall is connected to the lower end of the housing, and an inner wall of the face ring corresponds to the conical wall.

In order to achieve a limit connection between the face ring and the housing, further, the housing is provided with a plurality of housing limit strips on the upper side of the conical wall, and the face ring is provided with face ring limit strips corresponding to the housing limit strips.

In order to facilitate an engagement between the face ring limit strip and the housing limit strip, further, the face ring limit strip is provided with a face ring arc protrusion, a side of the face ring arc protrusion is provided with a limit block, and the housing limit strip is provided with a housing arc protrusion corresponding to the face ring arc protrusion. A through groove is provided below the face ring limit strip.

In order to facilitate an adjustment of the color temperature of a whole light, further, a dip switch is connected to the light source plate, the housing is provided with a relief groove corresponding to the dip switch, and a toggle handle is slidably provided in the relief groove.

Further in the present disclosure, the implementation method for the spring-adjustable LED light fixture includes the following steps:

(I). an edgefold of a spring body is inserted into a spring installation base from a slot;

(II). a limiting member is provided with an inclined surface for facilitating the insertion of the edgefold, and the other side of the limiting member is a vertical surface for limiting the edgefold to avoid the spring body being pulled out;

(III). a spring insert block limits the edgefold in an upward direction to avoid the spring body shaking up and down; and (IV). a limit wall limits two side directions of the edgefold to avoid the spring body shaking left and right.

Compared to the prior art, the present disclosure has the following advantageous effects:

1. In the present disclosure, the edgefold is provided on the spring body, the two symmetrical spring installation bases are provided on the top surface of the housing, the edgefold of the spring body is inserted into the spring insert block to be connected to the spring installation base, and the edgefold can slide in the spring installation base, thereby achieving an adjustment of different installation dimensions.

2. In the present disclosure, the spring insert block is provided with the slot for being inserted by the edgefold and limits the edgefold in an upward direction.

3. In the present disclosure, a side, corresponding to insertion of the edgefold, of the limiting member is provided with an inclined surface, and the provision of the inclined surface facilitates the insertion of the edgefold, such that the spring body can be assembled with the housing when the light fixture is installed, thereby reducing the packaging dimensions and costs.

4. In the present disclosure, the conical wall is connected to the lower end of the housing, and the inner wall of the face ring corresponds to the conical wall, thereby achieving the assembled connection between the face ring and the housing, which makes the face ring and the housing easier to mount and dismount, and thus face rings with different styling can be replaced according to personal preferences.

Figure 1:
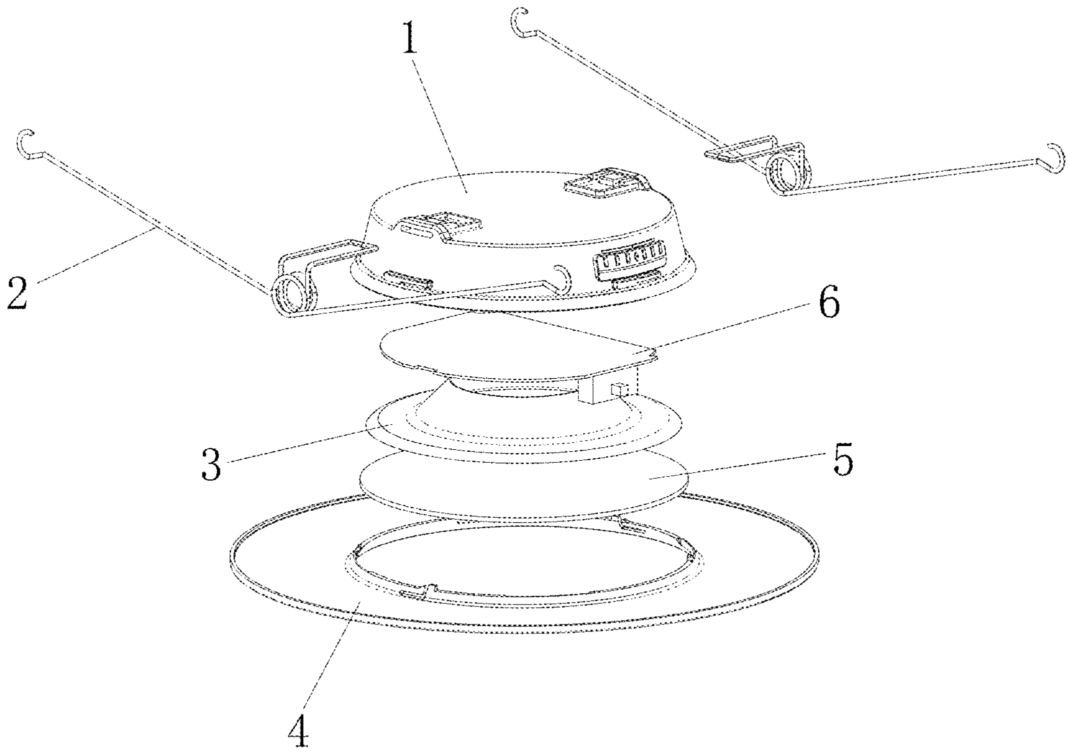
FIG. 1 is a structural exploded view of the present disclosure.
Figure 2:
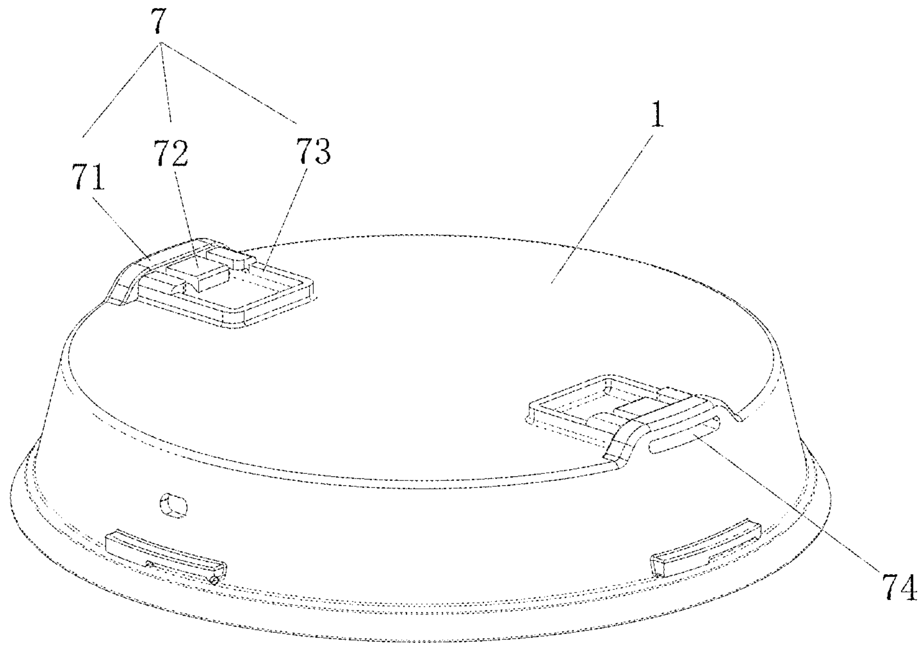
FIG. 2 is a structural schematic diagram of a housing according to the present disclosure.
Figure 3:
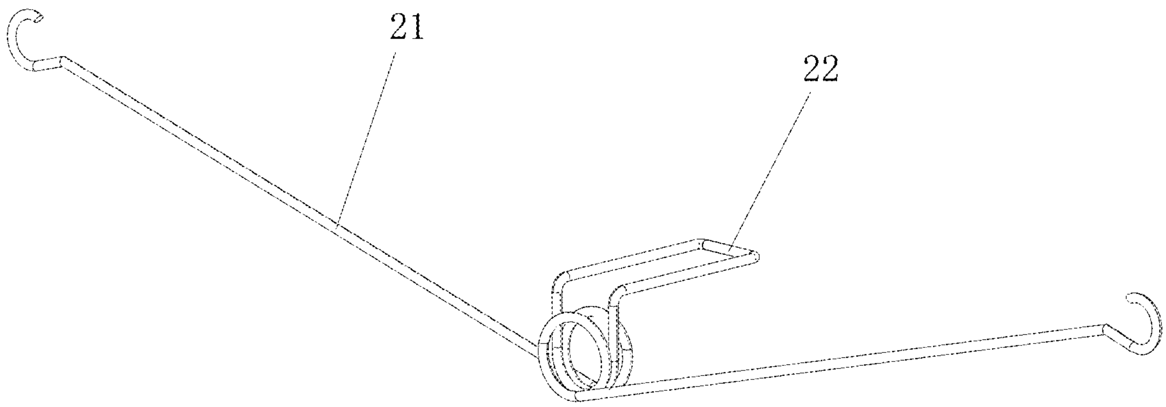
FIG. 3 is a structural schematic diagram of a spring body according to the present disclosure.
Figure 4:
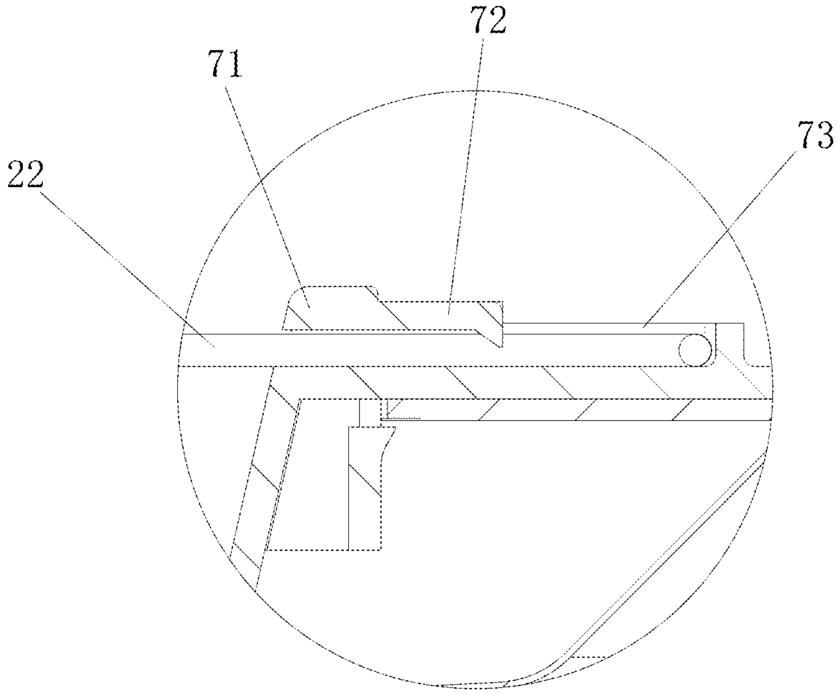
FIG. 4 is a partial cross-sectional structural schematic diagram showing an edgefold and a spring installation base connected according to the present disclosure.
Figure 5:
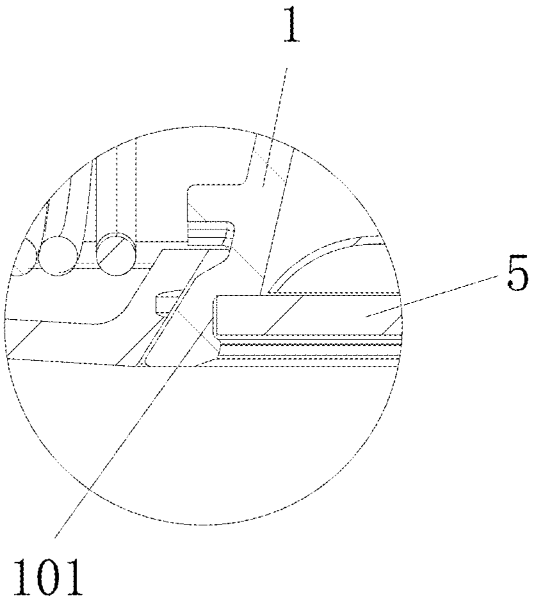
FIG. 5 is a partial cross-sectional structural schematic diagram showing a diffusion plate and a housing connected according to the present disclosure.
Figure 6:
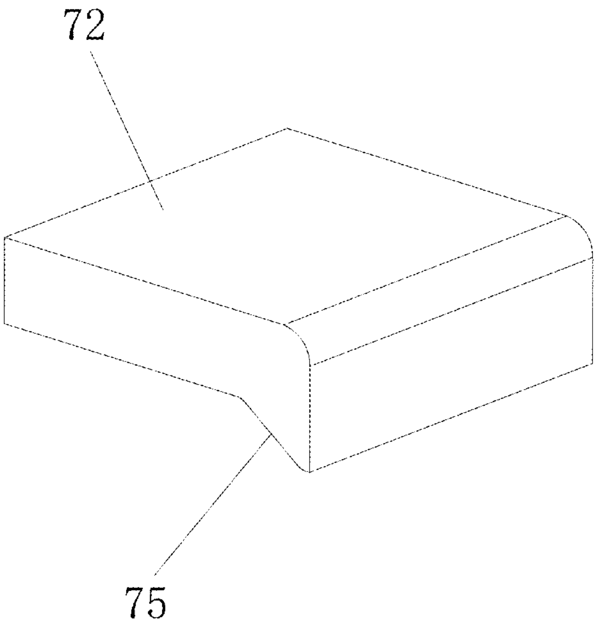
FIG. 6 is a structural schematic diagram of a limiting member according to the present disclosure.
Figure 7:
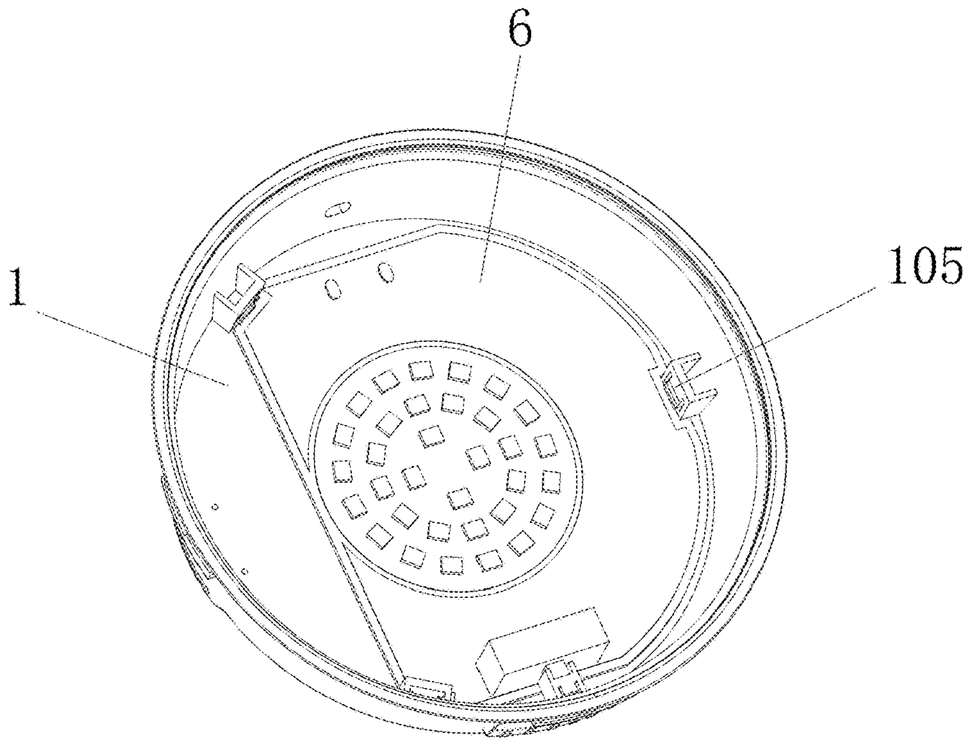
FIG. 7 is a structural schematic diagram showing a light source plate and a housing connected according to the present disclosure.
Figure 8:
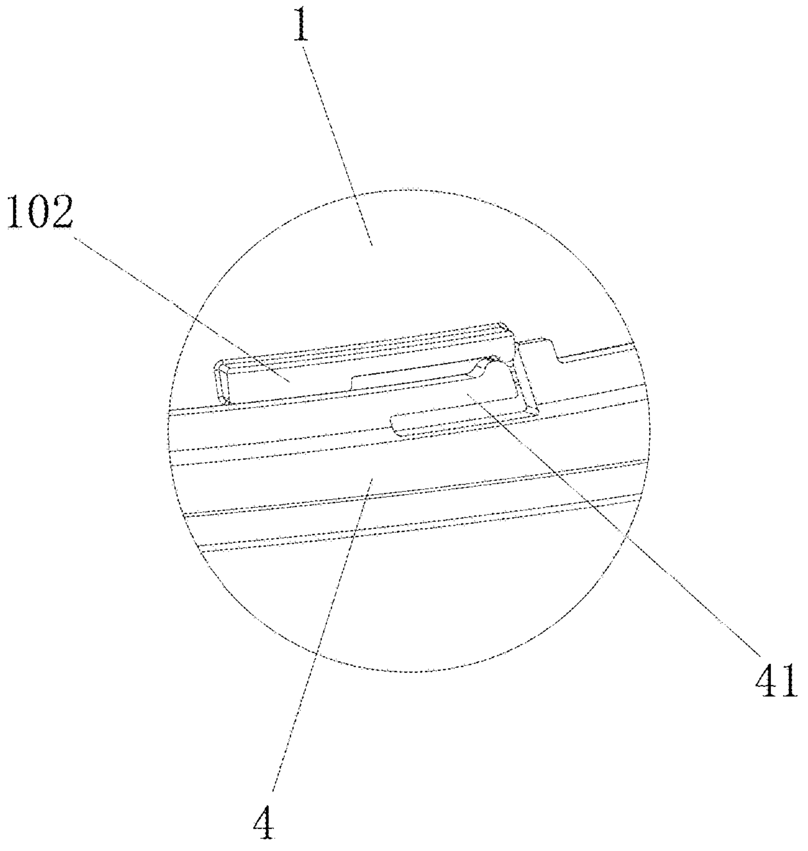
FIG. 8 is a partial structural schematic diagram showing a face ring and a housing connected according to the present disclosure.
Figure 9:
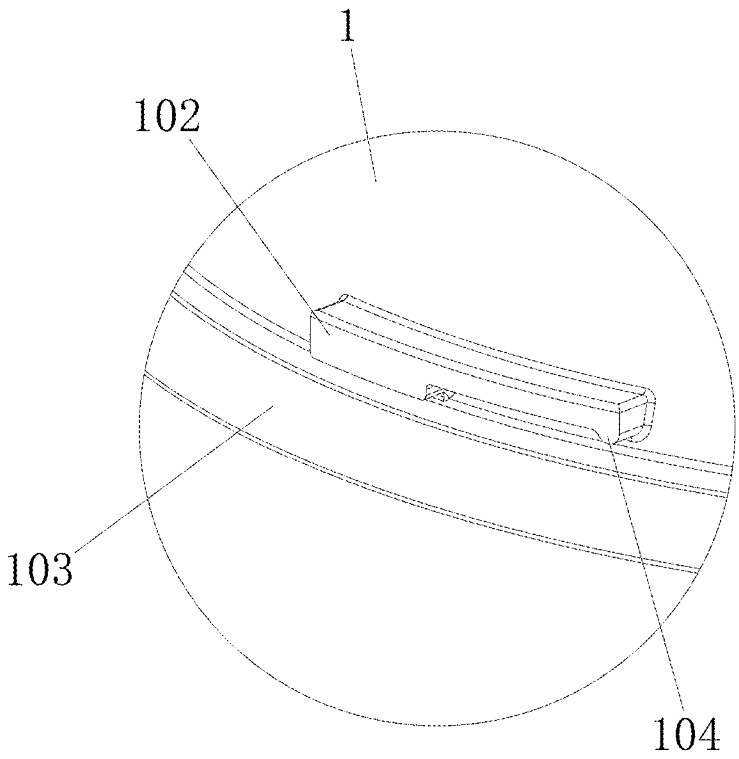
FIG. 9 is a partial structural schematic diagram of a housing according to the present disclosure.
Figure 10:
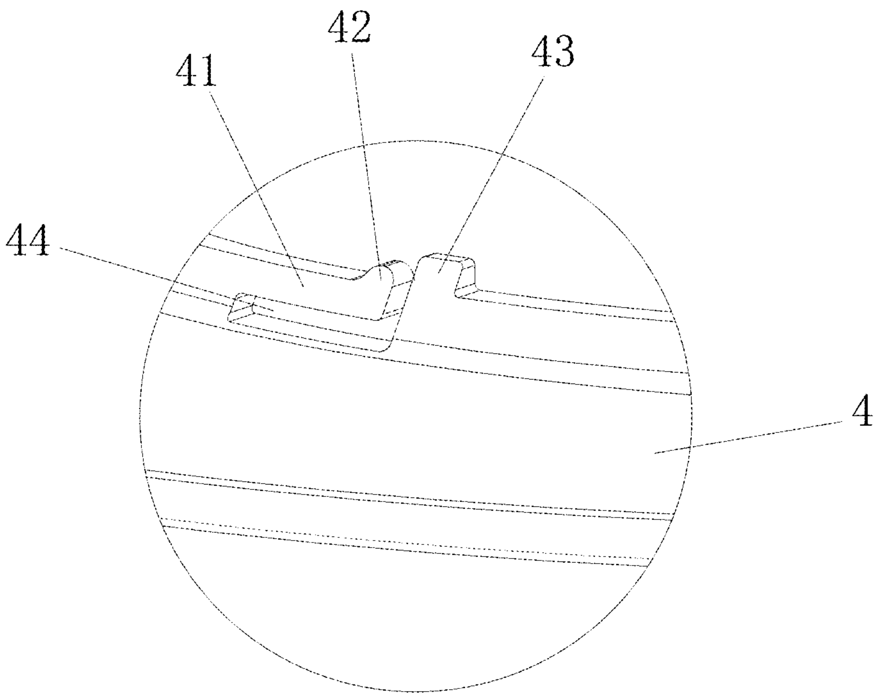
FIG. 10 is a partial structural schematic diagram of a face ring according to the present disclosure.

Numeral references: 1. housing; 101. annular groove; 102. housing limit strip; 103. conical wall; 104. housing arc protrusion; 105. light source plate fastener; 2. spring body; 21. V-shaped spring; 22. edgefold; 3. reflection cup; 4. face ring; 41. face ring limit strip; 42. face ring arc protrusion; 43. limit block; 44. through groove; 5. diffusion plate; 6. light source plate; 7. spring installation base; 71. spring insert block; 72. limiting member; 73. limit wall; 74. slot; 75. inclined surface; and 8. fastener sheet.

DETAILED DESCRIPTION

The technical solutions in the embodiments of the present disclosure will now be described clearly and fully hereinafter with reference to the accompanying drawings in the embodiments of the present disclosure. Apparently, the embodiments described are merely a few, but not all embodiments of the present disclosure. Based on the embodiments of the present disclosure, all other embodiments obtained by those of ordinary skill in the art without inventive effort fall within the scope of protection of the present disclosure.

Embodiment 1

With reference to FIGS. 1 to 7, the present disclosure provides the following technical solution: a spring-adjustable LED light fixture, including a housing 1 and two spring bodies 2, where a light source plate 6 is installed inside the housing 1; a reflection cup 3 is provided below the light source plate 6; a diffusion plate 5 is provided below the reflection cup 3; a face ring 4 is connected below the circumference of the housing 1; two symmetrical spring installation bases 7 are provided on the top surface of the housing 1; each of the spring installation bases 7 includes a spring insert block 71; two limit walls 73 are connected to a side of the spring insert block 71; a limiting member 72 is further connected to the middle position of the side of the spring insert block 71; each spring body 2 includes a V-shaped spring 21; an edgefold 22 is connected to the middle position of the V-shaped spring 21 and is inserted into the spring installation base 7.

By employing the above technical solution, in the present disclosure, the spring body 2 is provided with the edgefold 22; the two symmetrical spring installation bases 7 are provided on the top surface of the housing 1; the edgefold 22 of the spring body 2 is inserted into the spring insert block 71 to be connected to the spring installation base 7 and can slide in the spring installation base 7, thereby achieving an adjustment of different installation dimensions.

Specifically, the spring insert block 71 is provided with a slot 74.

By employing the above technical solution, the slot is used for inserting the edgefold 22 and limiting the edgefold 22 in an upward direction.

Specifically, a side of the limiting member 72 facing the direction of insertion of the edgefold 22 (i.e. the side facing the slot 74) is provided with an inclined surface 75, and the other side of the limiting member 72 back to the direction of insertion of the edgefold 22 (i.e the side back to the slot 74) is a vertical surface, and the vertical surface limits the inserted edgefold 22 to avoid the spring body 2 being pulled out.

By employing the above technical solution, the provision of the inclined surface 75 facilitates the insertion of the edgefold 22, such that the spring body 2 can be assembled with the housing 1 when the light fixture is installed, thereby reducing packaging dimensions and costs.

Specifically, the inner wall of the housing 1 is provided with a annular groove 101, and the diffusion plate 5 is embedded into the annular groove 101.

By employing the above technical solution, the assembled connection between the diffusion plate 5 and the housing 1 is achieved.

Specifically, a light source plate fastener 105 is connected to the interior of the housing 1, and the light source plate 6 is connected to the housing 1 by the light source plate fastener 105.

By employing the above technical solution, rapid installation of the light source plate 6 is facilitated.

Embodiment 2

With reference to FIGS. 6 to 10, this embodiment differs from Embodiment 1 in that: specifically, a conical wall 103 is connected to the lower end of the housing 1, and the inner wall of the face ring 4 corresponds to the conical wall 103.

By employing the above technical solution, the assembled connection between the face ring 4 and the housing 1 is achieved, which makes the face ring 4 and the housing 1 easier to mount and dismount, and thus face rings with different styling can be replaced according to personal preferences.

Specifically, the housing 1 is provided with a plurality of housing limit strips 102 on the upper side of the conical wall 103, and the face ring 4 is provided with face ring limit strips 41 corresponding to the housing limit strips 102.

By employing the above technical solution, the limit connection between the face ring 4 and the housing 1 is achieved.

Specifically, the face ring limit strip 41 is provided with a face ring arc protrusion 42, a side of the face ring arc protrusion 42 is provided with a limit block 43, and the housing limit strip 102 is provided with a housing arc protrusion 104 corresponding to the face ring arc protrusion 42. A through groove 44 is provided below the face ring limit strip 41.

By employing the above technical solution, the engagement between the face ring limit strip 41 and the housing limit strip 102 is facilitated.

Embodiment 3

This embodiment differs from Embodiment 1 in that: specifically, a dip switch is connected to the light source plate 6, the housing 1 is provided with a relief groove corresponding to the dip switch, and a toggle handle is slidably provided in the relief groove.

By employing the above technical solution, the adjustment of the color temperature of a whole light is facilitated.

Embodiment 4

Figure 11:
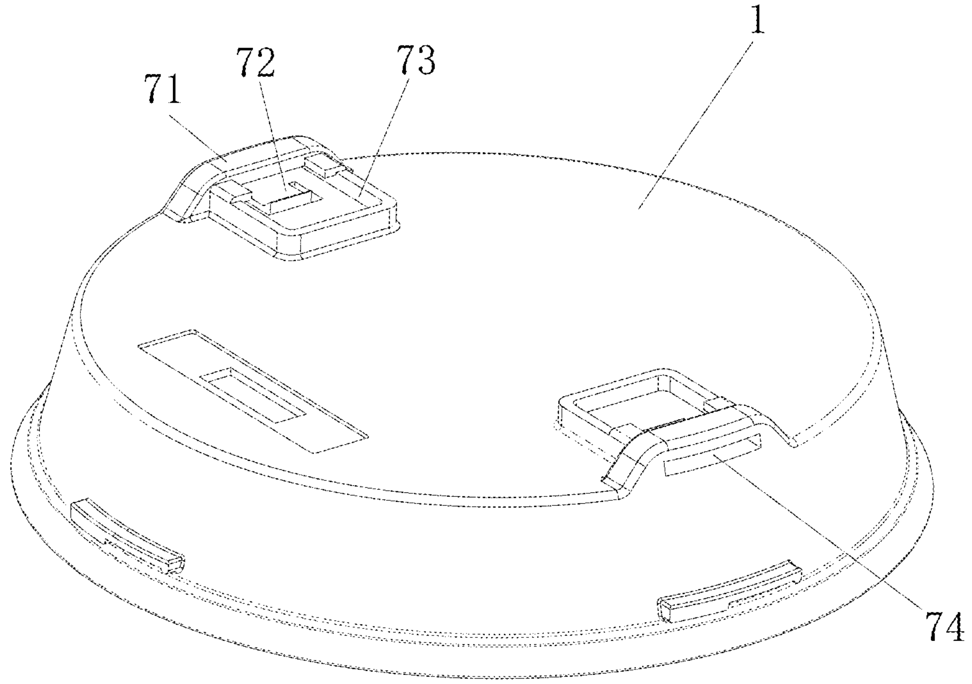
FIG. 11 is a structural schematic diagram of a housing in Embodiment 4 according to the present disclosure.

With reference to FIG. 11, this embodiment differs from Embodiment 1 in that: specifically, the limiting member 72 is provided on the top surface of the housing 1.

Embodiment 5

Figure 12:
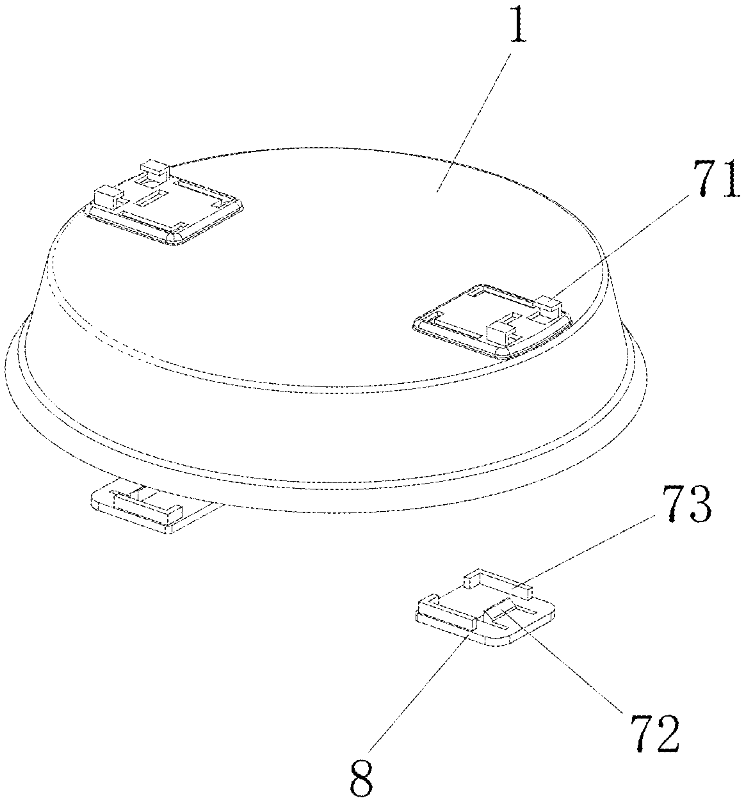
FIG. 12 is a structural schematic diagram of a housing in Embodiment 5 according to the present disclosure.

With reference to FIG. 12, this embodiment differs from Embodiment 1 in that: specifically, the limiting member 72 and the limit wall 73 are provided on a limiting element 8, and the limiting element 8 is inserted from the interior of the housing 1 to the top surface of the housing 1 for installation.

Embodiment 6

Further, an implementation method for the spring-adjustable LED light fixture according to the present disclosure includes the following steps:

(I). an edgefold 22 of a spring body 2 is inserted into a spring installation base 7 from a slot 74;

(II). a limiting member 72 is provided with an inclined surface 75 for facilitating the insertion of the edgefold 22, and the other side of the inclined surface 75 is a vertical edge for limiting the edgefold 22 to avoid the spring body 2 being pulled out;

(III). a spring insert block 71 limits the edgefold 22 in an upward direction to avoid the spring body 2 shaking up and down; and (IV). a limit wall 73 limits two side directions of the edgefold 22 to avoid the spring body 2 shaking left and right.

In summary, in the present disclosure, the edgefold 22 is provided on the spring body 2; two symmetrical spring installation bases 7 are provided on the top surface of the housing 1; the edgefold 22 of the spring body 2 is inserted into the spring insert block 71 to be connected to the spring installation base 7 and can slide in the spring installation base 7, thereby achieving the adjustment of different installation dimensions. In the present disclosure, the spring insert block 71 is provided with the slot 74 for inserting the edgefold 22 and limiting the edgefold 22 in an upward direction. In the present disclosure, a side, facing the slot 74, of the limiting member 72 is provided with an inclined surface 75, and the provision of the inclined surface 75 facilitates the insertion of the edgefold 22, such that the spring body 2 can be assembled with the housing 1 when the light fixture is installed, thereby reducing the packaging dimensions and costs. In the present disclosure, the lower end of the housing 1 is connected to the conical wall 103, and the inner wall of the face ring 4 corresponds to the conical wall 103, thereby achieving the assembled connection between the face ring 4 and the housing 1, which makes the face ring 4 and the housing 1 easier to mount and dismount, and thus face rings with different styling can be replaced according to personal preferences.

While the embodiments of the present disclosure have been shown and described, it will be understood by those skilled in the art that various changes, modifications, substitutions and variations may be made to these embodiments without departing from the principles and spirit of the present disclosure, the scope of which is defined by the appended claims and their equivalents.

The invention claimed is:

1. A spring-adjustable LED light fixture, comprising a housing and spring bodies, wherein a light source plate is installed inside the housing; a reflection cup is provided below the light source plate; a diffusion plate is provided below the reflection cup; a face ring is connected below a circumference of the housing; two symmetrical spring installation bases are provided on a top surface of the housing; each spring installation base comprises a spring insert block; a limit wall is connected to a side of the spring insert block; a limiting member is further connected to a middle position of the side of the spring insert block; and each spring body comprises a V-shaped spring; an edgefold is connected to a middle position of the V-shaped spring and inserted into the spring installation base.

2. The spring-adjustable LED light fixture according to claim 1, wherein the spring insert block is provided with a slot.

3. The spring-adjustable LED light fixture according to claim 1, wherein a side, facing a direction of insertion of the edgefold, of the limiting member is provided with an inclined surface, and another side of the limiting member back to the direction of insertion of the edgefold is a vertical surface.

4. The spring-adjustable LED light fixture according to claim 1, wherein an inner wall of the housing is provided with an annular groove, and the diffusion plate is embedded into the annular groove.

5. The spring-adjustable LED light fixture according to claim 1, wherein a conical wall is connected to a lower end of the housing, and an inner wall of the face ring corresponds to the conical wall.

6. The spring-adjustable LED light fixture according to claim 5, wherein the housing is provided with a plurality of housing limit strips on an upper side of the conical wall, and the face ring is provided with face ring limit strips corresponding to the housing limit strips.

7. The spring-adjustable LED light fixture according to claim 6, wherein each face ring limit strip is provided with a face ring arc protrusion, a side of the face ring arc protrusion is provided with a limit block, and each housing limit strip is provided with a housing arc protrusion corresponding to the face ring arc protrusion.

8. The spring-adjustable LED light fixture according to claim 7, wherein a through groove is provided below the face ring limit strip.

9. The spring-adjustable LED light fixture according to claim 1, wherein a dip switch is connected to the light source plate, the housing is provided with a relief groove corresponding to the dip switch, and a toggle handle is slidably provided in the relief groove.

10. An implementation method for the spring-adjustable LED light fixture according to claim 1, wherein the method comprises:

inserting an edgefold of a spring body into a spring installation base from a slot;

providing a limiting member with an inclined surface for facilitating the insertion of the edgefold, and limiting the edgefold by a vertical surface of the limiting member to avoid the spring body being pulled out;

limiting the edgefold in an upward direction via a spring insert block to avoid the spring body shaking up and down; and limiting two sides of the edgefold by limit walls to avoid the spring body shaking left and right.

* * * * *